US007490075B2

(12) United States Patent  
Lind et al.

(10) Patent No.: US 7,490,075 B2  
(45) Date of Patent: Feb. 10, 2009

(54) SCALEABLE DATA ITEMSETS AND ASSOCIATION RULES

(75) Inventors: Jesper B. Lind, Seattle, WA (US); Christopher A. Meek, Kirkland, WA (US); C. James MacLennan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

(21) Appl. No.: 11/041,826

(22) Filed: Jan. 24, 2005

(65) Prior Publication Data

US 2006/0167839 A1 Jul. 27, 2006

(51) Int. Cl.  
*G06F 7/00* (2006.01)

(52) U.S. Cl. ........................ 707/1; 707/2; 707/3; 707/5; 707/6

(58) Field of Classification Search ............... 707/1, 707/2, 3, 5–6, 4  
See application file for complete search history.

(56) References Cited

U.S. PATENT DOCUMENTS

| | | | | |
|---|---|---|---|---|
| 5,615,341 A | * | 3/1997 | Agrawal et al. | 705/10 |
| 5,724,573 A | * | 3/1998 | Agrawal et al. | 707/3 |
| 5,842,200 A | * | 11/1998 | Agrawal et al. | 707/1 |
| 5,920,855 A | * | 7/1999 | Aggarwal et al. | 707/3 |
| 6,138,117 A | * | 10/2000 | Bayardo | 707/6 |
| 6,278,998 B1 | * | 8/2001 | Ozden et al. | 707/5 |
| 6,356,890 B1 | * | 3/2002 | Agrawal et al. | 707/2 |
| 6,826,569 B2 | * | 11/2004 | Robertson | 707/6 |
| 2002/0143521 A1 | * | 10/2002 | Call | 704/1 |

OTHER PUBLICATIONS

Christian Borgelt, Efficient implementations of apriori and eclat. In Bart Goethals and Mohammed J. Zaki, editors, Proceedings of the IEEE ICDM Workshop on Frequent Itemset Mining Implementations, Nov. 2003, Melbourne, FL, USA.

R. Agrawal, et al., Mining Associations between Sets of Items in Massive Databases, Proc. of the ACM-SIGMOD 1993 Int'l Conference on Management of Data, May 1993, pp. 207-216, Washington D.C.

* cited by examiner

*Primary Examiner*—Vincent F Boccio  
(74) *Attorney, Agent, or Firm*—Amin, Turocy & Calvin, LLP (57) ABSTRACT

The subject invention leverages scaleable itemsets and/or association rules to provide dynamic adjustment of memory usage. This allows the subject invention to provide association rules and/or itemsets with the highest support while utilizing a bounded amount of memory. Thus, a data analysis system and/or method utilizing the subject invention can self-adjust to provide the best association rules and/or itemsets based on available system resources. One instance of the subject invention employs dynamically adjustable minimum support values for data itemsets and/or association rules to facilitate in compensating for memory availability. In yet another instance of the subject invention a prefix tree data structure is utilized to facilitate in constructing itemsets. Memory utilization is then adjusted via pruning and/or reallocation of counter vectors and/or pointer vectors and/or reallocation of nodes of the prefix tree data structure for scaleable data itemsets and/or association rules.

18 Claims, 10 Drawing Sheets

SCALEABLE DATA ITEMSETS AND ASSOCIATION RULES

TECHNICAL FIELD

The subject invention relates generally to data analysis, and more particularly to systems and methods for creating and maintaining data itemsets and/or association rules in relation to memory utilization.

BACKGROUND OF THE INVENTION

The use of data analysis tools has increased dramatically as society has become more dependent on digital information storage. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Electronic commerce has pervaded almost every conceivable type of business. People have come to expect that their favorite stores not only have brick and mortar business locations, but that they can also be accessed "online," typically via the Internet's World Wide Web. The Web allows customers to view graphical representations of a business' store and products. Ease of use from the home and convenient purchasing methods, typically lead to increased sales. Buyers enjoy the freedom of being able to comparison shop without spending time and money to drive from store to store.

Online commerce has continuously developed to bring a more enjoyable buying experience to online buyers. Often, websites require a "log in" and/or utilize a "cookie" to track which buyer is looking at their website. With this information, a business can track purchase parameters such as type, size, quantity, and purchasing frequency. This is valuable information because it allows a company to forecast future sales and to determine what goods are of the most interest to online buyers. Typically, however, people are individual in nature and each person tends to have slightly different likes and dislikes. For example, a company which sells a lot of cellophane tape online might assume that their buyers are utilizing it for craft project building purposes. Since the company also sells colored glitter, they may include an advertisement for glitter next to their tape advertisement on their website. In actuality, however, most of the customers are purchasing the tape for business office use, and the glitter advertisement may even turn some customers away due to the fact that the company does not seem to understand its customer's needs correctly. The glitter advertisement could then even lead to decreased tape sales. Had the company, instead, offered staples and/or paper clips along with the tape, they might have seen increased sales for all of their products as buyers might now perceive their store as a "one-stop shop" for all of their business office supply needs.

Pairing up items for selling is often known as "associative selling." An effort is made to correlate various items/products based upon a particular buyer's past buying habits and/or the past buying habits of other buyers who purchased similar items in the past. This associative process can also be expanded beyond direct product sales. It can be utilized indirectly to enhance sales such as with television viewing habits. A television company can predict that most viewers of show X are men who prefer rugged sports such as football, extreme-mountaineering, and rugby. This would give the television company a good idea that programming an opera or ballet in this time slot would probably reduce their viewer ratings. Even the existing show could be "enhanced" with more rugged content to increase the size of show X's audience. A successful show with a large audience naturally draws advertisers who want to reach more of their market. Thus, the viewing habits can even be used to provide appropriate commercials that have a high audience acceptance rate for a particular genre of viewers.

A salesperson typically approaches a customer and asks them a series of questions to better understand their likes and dislikes along with their prior purchasing habits. Through this interaction, the salesperson is able to determine suggestions for products this particular customer might like. This same type of "associative selling" is also just as important to online merchants. However, online there is not a salesperson to "size up" a customer and determine their needs and wants. Instead, programs are utilized to determine suggestions for online buyers when they visit a business' website. For example, consider an online buyer who previously bought a dog bowl and a dog bone. Probabilities can be determined that show that it is likely that this person owns a dog. The person might, therefore, be interested in dog related items such as dog collars, leashes, and brushes. Since these items are brought to the attention of the buyer, if it matches their needs, they are more likely to purchase those items than, for instance, an advertisement for catnip or a bird feeder.

Although knowing associations is extremely advantageous, it is also generally very difficult to actually determine those associations. This is generally due to complex computing requirements, difficulty in accessing and retrieving the necessary information, and/or long computational calculation times. Typically, a process reviews the data and looks for patterns in the data along with the frequency in which the patterns appear. These patterns facilitate to determine "association rules" that can be analyzed to determine the likelihood that given particular data an outcome can be predicted. Generally speaking, only the stronger association rules or those above a certain level of frequency are utilized. Thus, an association that occurs less than, for example, five times might be discarded. This frequency threshold limit is also known as the "minimum support."

For large amounts of data, the review process to determine association rules often requires large amounts of memory. It is common for all available memory to be utilized before all of the data has been reviewed. This causes decreased performance in systems where alternative memory is available such as those that page memory onto a hard drive and the like. Systems without alternative memory might not be able to process the data at all. Thus, memory size has a substantial impact on the quality and ability of a system to fully process large databases. This can cause an ever increasing demand for more memory in order to compensate or an ever increasing processing time while the system accesses alternate memory storage.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to data analysis, and more particularly to systems and methods for creating and maintaining data itemsets and/or association rules in relation to memory utilization. Scaleable itemsets and/or association rules are leveraged to provide dynamic adjustment of memory usage. This allows the subject invention to provide association rules and/or itemsets with the highest support while utilizing a bounded amount of memory. Thus, a data analysis system and/or method utilizing the subject invention can self-adjust to provide the best association rules and/or itemsets based on available system resources. One instance of the subject invention employs dynamically adjustable minimum support values for data itemsets to facilitate in compensating for memory availability. In this manner, the minimum support value can be automatically increased as memory space decreases. In another instance of the subject invention, a data association rule system and/or method can also utilize the dynamically adjusted minimum support value for itemsets to create scaleable association rules to compensate for available memory. In yet another instance of the subject invention a prefix tree data structure is utilized to facilitate in constructing itemsets. Memory utilization is then adjusted via pruning and/or reallocation of counter vectors and/or pointer vectors and/or reallocation of nodes of the prefix tree data structure. In still yet another instance of the subject invention, prefix tree data structures are utilized to provide scaleable association rules based on available memory. Thus, the subject invention provides a substantial increase in the efficiency of memory utilization while still maintaining a high level of user satisfaction by providing the highest support data itemsets and/or association rules achievable based on available memory.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The subject invention provides an improvement to the manner in which a database creates and maintains itemsets and/or association rules. The systems and methods of the subject invention require less data for the process to operate correctly, thus reducing memory requirements. Since the data sometimes exceeds the size of memory, this is a substantial improvement over existing technology. Without the subject invention, some systems would not be able to complete their task given data and algorithm parameters resulting in itemsets and association rules requiring more memory for storage than their memory resources. Other systems, while able to function given the same data size and algorithm parameters, may require that memory be paged onto a hard drive and the like, dramatically slowing the process. The subject invention provides scaleable itemsets that can also be utilized to provide scaleable association rules. Thus, the itemsets and/or the association rules can be scaled to operate efficiently with a bounded amount of memory. This allows a user to quickly ascertain high quality information from large databases despite having limited system resources.

Figure 1:
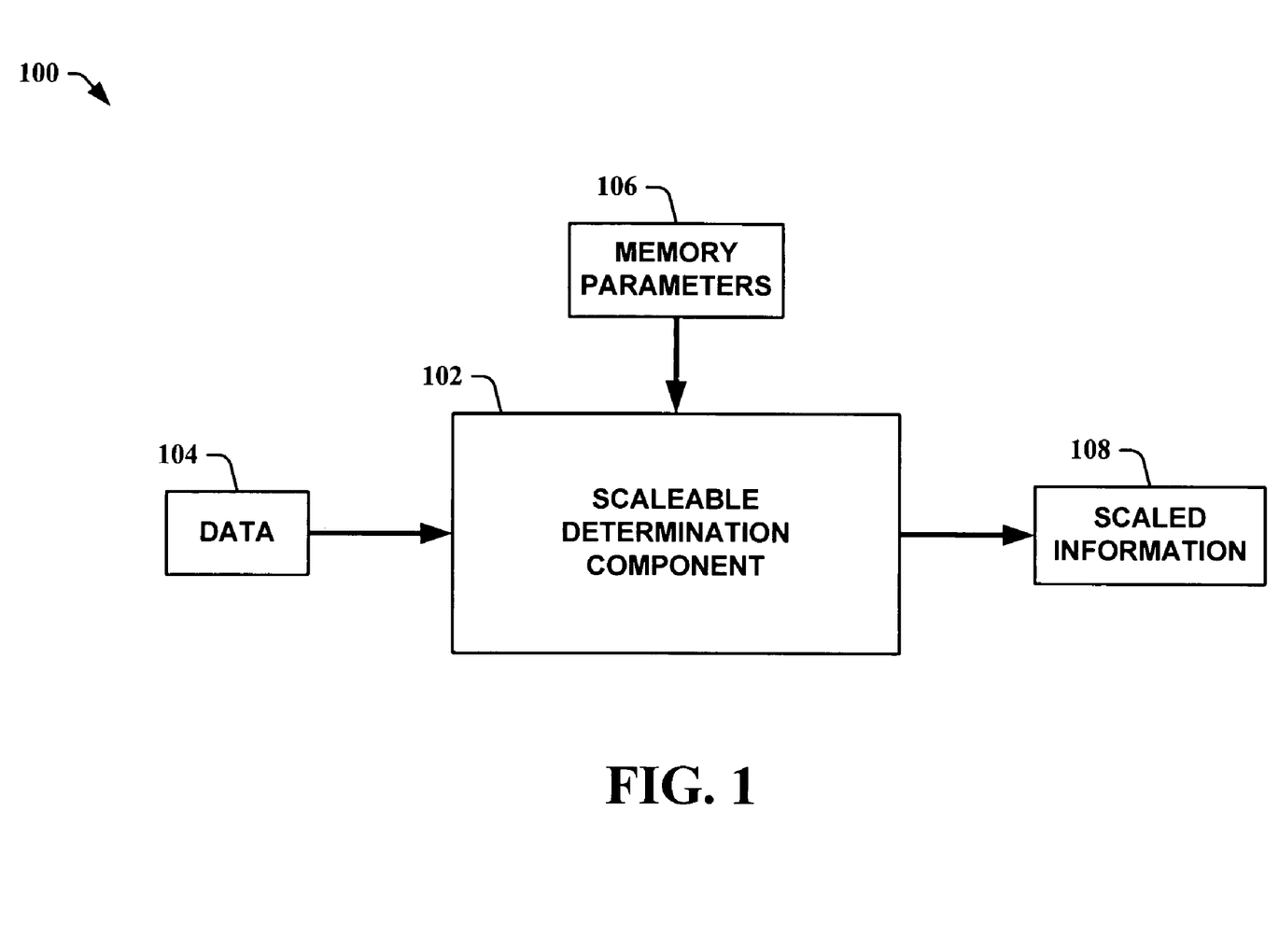
FIG. 1 is a block diagram of a data analysis facilitating system in accordance with an aspect of the subject invention.

In FIG. 1, a block diagram of a data analysis facilitating system 100 in accordance with an aspect of the subject invention is shown. The data analysis facilitating system 100 is comprised of a scaleable determination component 102. The scaleable determination component 102 receives data 104 from a source such as, for example, a database and processes the data 104. The scaleable determination component 102 also receives memory parameters 106 that facilitate in determining scaled information 108 based on the data 104. The memory parameters 106 can include, for example, memory size, memory type, memory speed, and/or memory location and the like. Thus, if the memory parameters indicate that the available memory for a given task is "X," the scaleable determination component 102 scales the scaled information 108 to function within memory size "X." The scaled information 108 can be comprised of scaled itemset information and/or scaled association rule information and the like that pertain to the data 104. The determination processes of the scaleable determination component 102 are described in detail infra.

Figure 2:
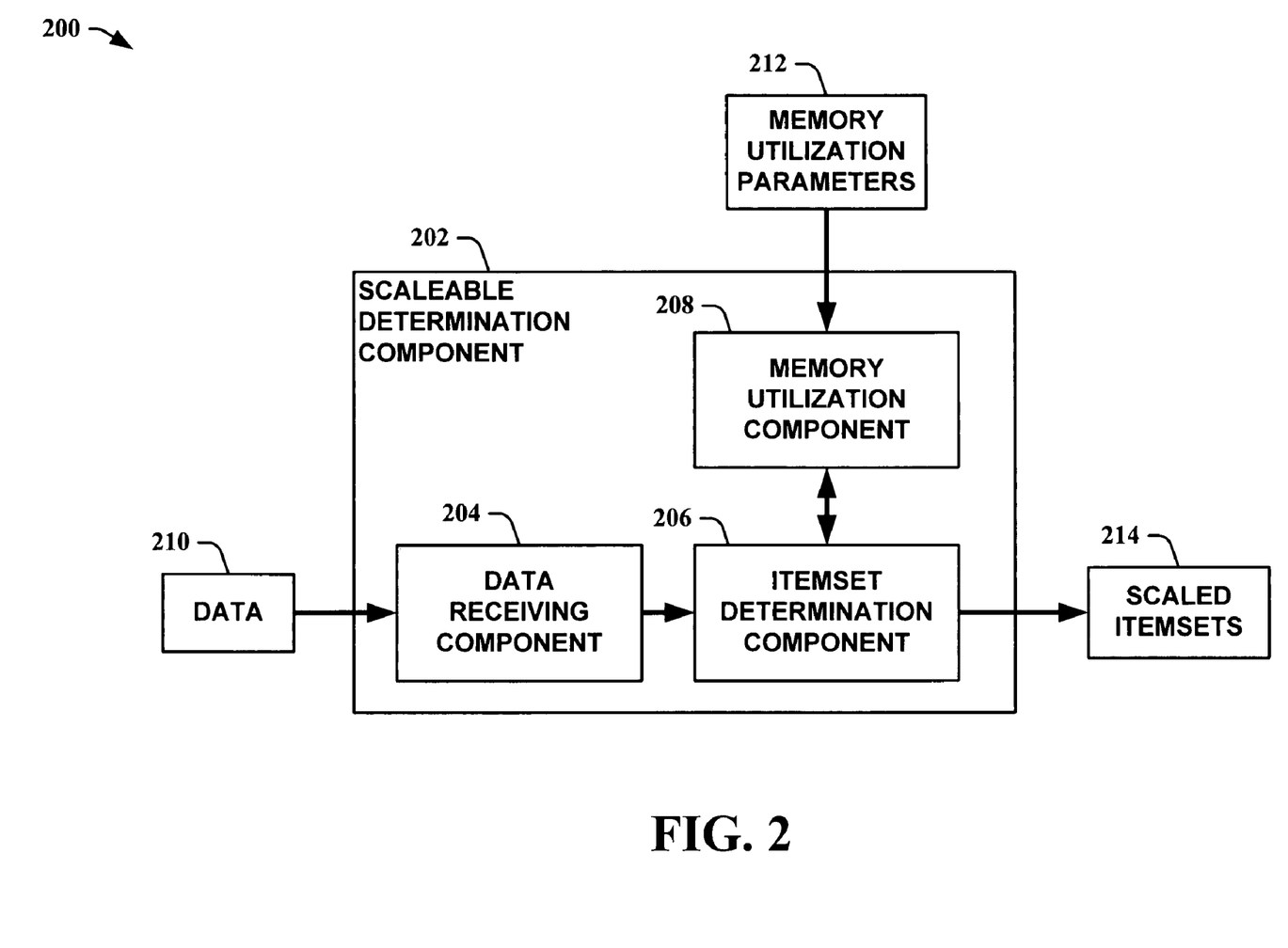
FIG. 2 is another block diagram of a data analysis facilitating system in accordance with an aspect of the subject invention.

Referring to FIG. 2, a block diagram of another data analysis facilitating system 200 in accordance with an aspect of the subject invention is depicted. This instance of the subject invention is utilized to determine itemsets. The data analysis facilitating system 200 is comprised of a scaleable determination component 202 that is comprised of a data receiving component 204, an itemset determination component 206, and a memory utilization component 208. The data receiving component 204 receives data 210 from a data source such as, for example, a database and the like. The itemset determination component 206 then receives the data 210 from the data receiving component 204. The itemset determination component 206 interfaces with the memory utilization component 208 which, in turn, receives memory utilization parameters 212. The memory utilization component 208 facilitates usage and/or determination of available memory. Thus, in one instance of the subject invention the memory utilization component 208 interfaces with memory to employ a memory block allocation scheme that facilitates in releasing blocks of memory, eliminating memory fragmentation associated with traditional memory allocation schemes. The itemset determination component 206 receives memory bounding requirements from the memory utilization component 208 and employs it to facilitate in determining and scaling itemsets to produce scaled itemsets 214. The scaled itemsets 214 and/or related data is/are stored within memory, and, thus, by scaling this information, memory usage can be controlled. This substantially increases the speed of the determination process while yielding informative information. In one instance of the subject invention, the itemset determination component 206 utilizes a dynamically adjusted minimum support to facilitate in automatically adjusting memory utilization.

Figure 3:
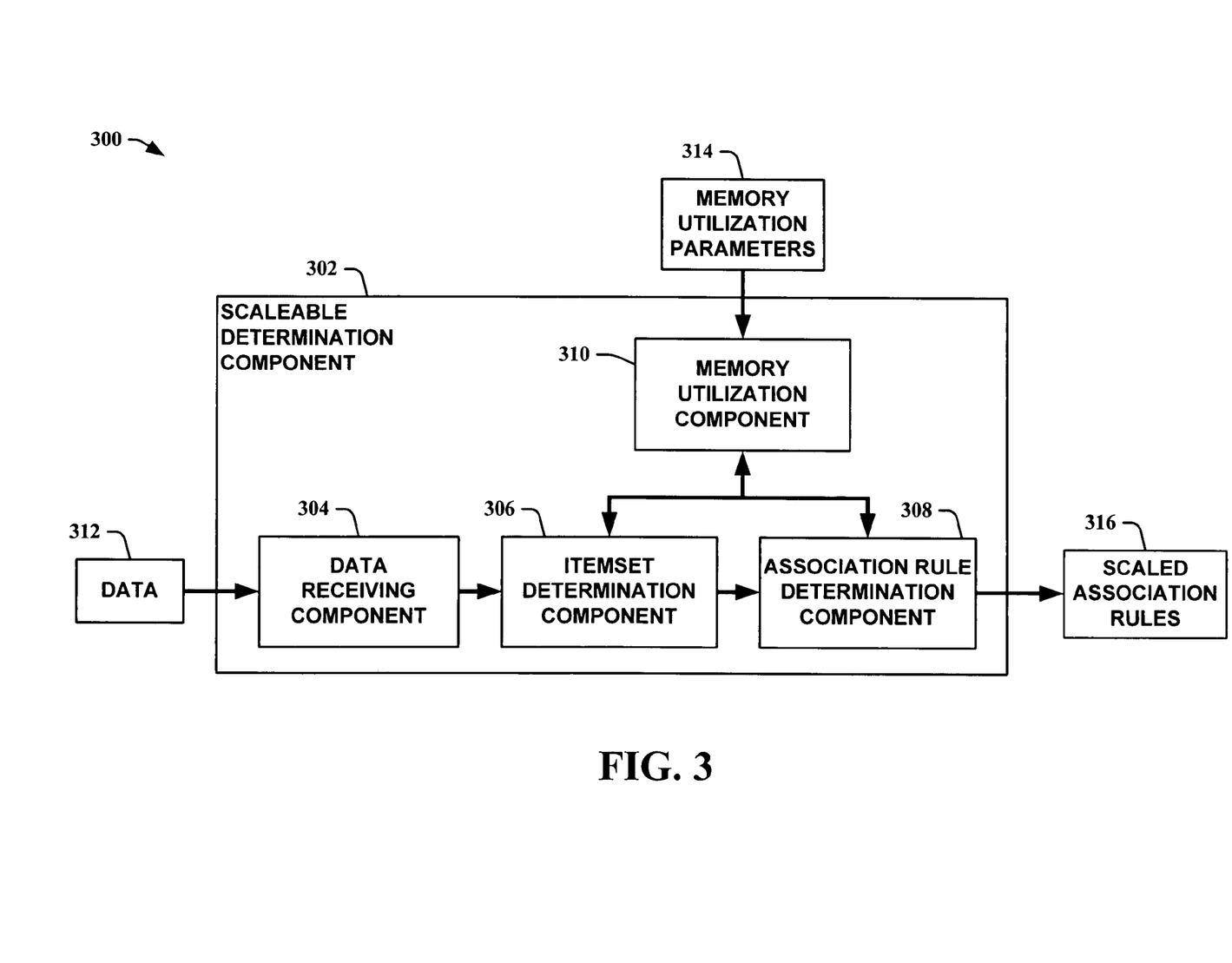
FIG. 3 is yet another block diagram of a data analysis facilitating system in accordance with an aspect of the subject invention.

Looking at FIG. 3, yet another block diagram of a data analysis facilitating system 300 in accordance with an aspect of the subject invention is illustrated. This instance of the subject invention is utilized to determine association rules. The data analysis facilitating system 300 is comprised of a scaleable determination component 302 that is comprised of a data receiving component 304, an itemset determination component 306, an association rule determination component 308, and a memory utilization component 310. The data receiving component 304 receives data 312 from a data source such as, for example, a database and the like. The itemset determination component 306 then receives the data 312 from the data receiving component 304. The itemset determination component 306 can interface with the memory utilization component 310 which, in turn, receives memory utilization parameters 314. The memory utilization component 310 facilitates usage and/or determination of available memory. Thus, in one instance of the subject invention the memory utilization component 310 interfaces with memory to employ a memory block allocation scheme that facilitates in releasing blocks of memory, eliminating memory fragmentation associated with traditional memory allocation schemes. If necessary, the itemset determination component 306 receives memory bounding requirements from the memory utilization component 310 and employs it to facilitate in determining and scaling itemsets to produce scaled itemsets for the association rule determination component 308. The association rule determination component 308 can utilize the scaled itemsets to facilitate in determining scaled association rules 316. The association rule determination component 308 can also interface with the memory utilization component 310 to facilitate in determining the scaled association rules 316.

One skilled in the art will appreciate that the data analysis facilitating system 200 of FIG. 2 can be effectively integrated in place of the data receiving component 304, the itemset determination component 306 and the memory utilization component 310. Thus, in one instance of the subject invention, the scaled itemsets 212 provided by the data analysis facilitating system 200 are, effectively, employed by the association rule determination component 308 to provide the scaled association rules 316.

In generally, itemsets are typically constructed first in order to determine association rules. The association rules are based upon a process that employs an association algorithm. Thus, the association rules algorithm analyzes data and generates rules describing the data. A common scenario, for example, is the analysis of market basket data, where the data consists of customer purchase records. TABLE 1 below provides an example of such a database.

TABLE 1

Example Database

| Customer ID | Product |
|---|---|
| 1 | Coke |
| 1 | Beer |
| 1 | Diapers |
| 2 | Coke |
| 2 | Pepsi |
| 2 | Beer |
| 2 | Diapers |
| 3 | Coke |
| 4 | Coke |
| 4 | Beer |

In this scenario a rule generated can take the form, for example, of "Beer, Coke→Diapers," describing the pattern— if a customer buys beer and coke they would probably also buy diapers.

An itemset is a group of items that occur in the database. A frequent itemset is an itemset that occurs more frequently than a threshold specified by a user, and usually referred to as minimum support. TABLE 2 shows the itemsets constructed from the database of TABLE 1 with the minimum support=2.

TABLE 2

Example Itemsets for Database

| Itemset | Frequency |
|---|---|
| Coke | 4 |
| Beer | 3 |
| Diapers | 2 |
| Coke, Beer | 3 |
| Coke, Diapers | 2 |
| Beer, Diapers | 2 |
| Coke, Beer, Diapers | 2 |

In the process of generating the rules, the algorithm needs access to counts of items that constitute the itemset frequencies. The itemsets can be generated, for example, by scanning the data repeatedly, counting combinations of items. The number of itemsets gathered can be controlled by a user by setting the minimum support to a certain desired level.

After the itemsets have been generated, the association rules can be generated as a post processing step. An association rule can be formed from frequent itemsets by taking pairs of itemsets that differ in one item. Thus, any pair of itemsets may give rise to a rule if they differ in just one item. For example, the itemsets <Coke,Beer> and <Coke,Beer,Diapers> can form the association rule: <Coke,Beer>→Diapers. This rule will have the support of 2. The conditional probability of a rule is usually referred to as confidence. In this case, the confidence is 66.7% (⅔) since the left hand side (LHS) of the rule has a frequency of 3 and the right hand side has a frequency of 2.

The algorithm for generating the itemsets generally relies on all counts residing in a main memory of a computational system. In some situations, keeping the counts of product combinations can exceed the amount of memory available in the system. Instances of the subject invention provide systems and methods that change the minimum support to the algorithm, thereby reducing the number of counts being gathered, to allow the remaining counts to fit in available memory. A naïve approach is to abandon the current counting altogether and start over with a different minimum support such that all the counts would fit into memory. The approach of an instance of the subject invention is to allow the algorithm to enable a data structure to reorganize the counts within the limitation of the memory size and reduce the utilization of memory. The algorithm then continues from where it left off.

Thus, the subject invention provides instances that compute frequent itemsets with the highest support utilizing a bounded amount of memory. This is accomplished in one instance, for example, by employing prefix data tree structures that are organized in a fashion that enables the algorithm to prune the tree without utilizing substantial extra memory. The prefix data tree structures are discussed in more detail infra. This provides the algorithm's ability to reallocate the counter vectors of the tree and allows an instance of the subject invention to dynamically adjust the minimum support to facilitate in memory utilization. The algorithm handles out of memory exceptions by, not starting over, but continuing to execute after having adjusted the minimum support and reorganized the counts to free up memory.

Figure 4:
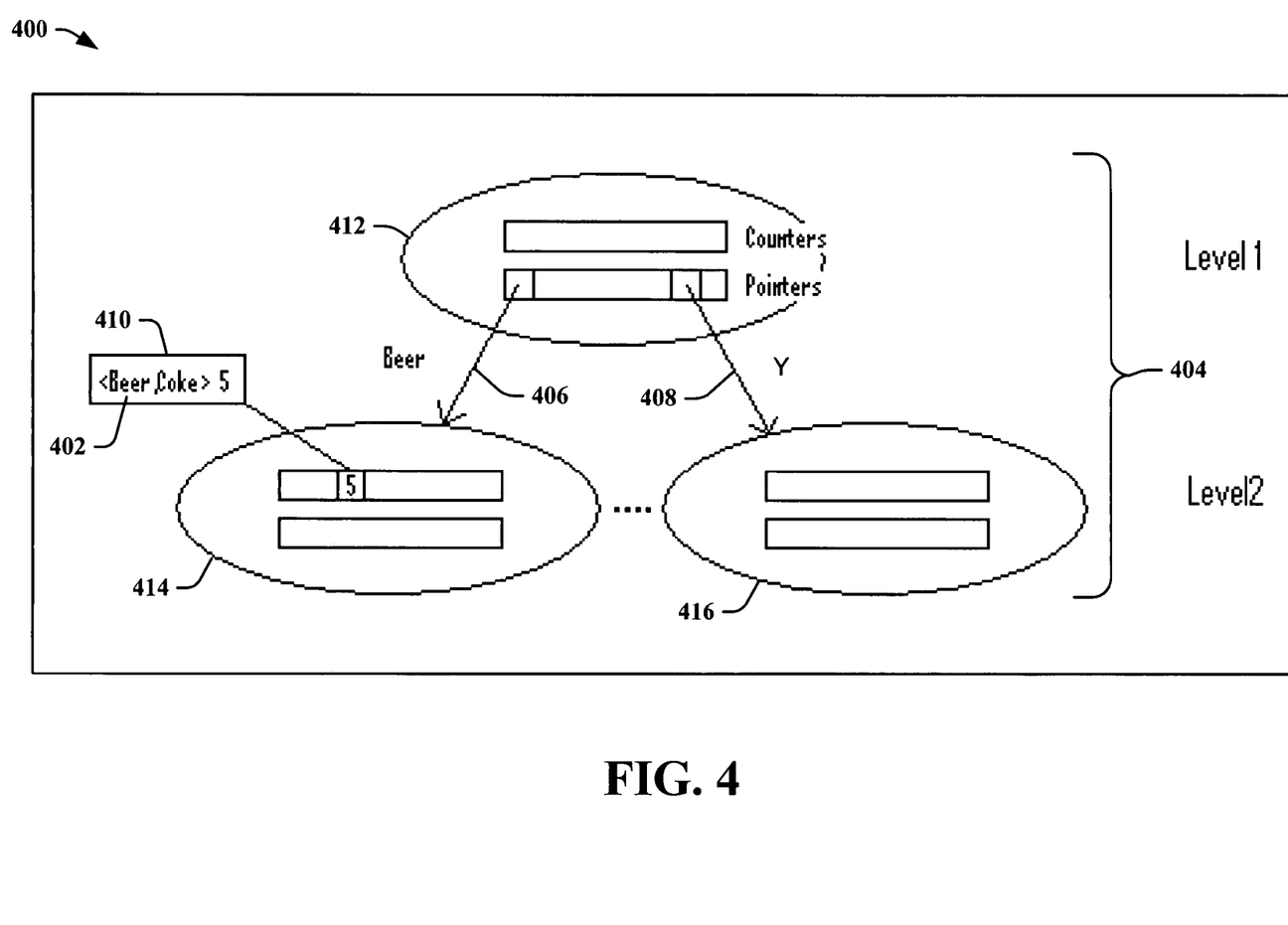
FIG. 4 is an illustration of a prefix data tree structure in accordance with an aspect of the subject invention.

In FIG. 4, an illustration of a prefix data tree structure 400 in accordance with an aspect of the subject invention is shown. As noted previously, the association rules algorithm analyzes data stored in a database and generates rules describing the data. Each entity in the database is referred to as an item (e.g., beer 402). Prior to generating rules, the algorithm builds a data structure called a prefix tree 404. The prefix tree 404 is efficient at storing groups of items and their corresponding counts by leveraging the fact that some groups are subsets of others. Each path (e.g., Beer path 406 and "Y" path 408) in a tree describes an itemset 410 which is a group of items. Thus, in the prefix data tree structure 400, the initial node is root node 412 that contains individual items (itemsets of size 1). The beer path 406 points to node 414 which contains the <beer, coke> itemset 410. Other itemsets within this node 414 will contain itemsets that also include beer. Similarly, the Y path 408 will point to node 416 that contains itemsets that include an item "Y."

The algorithm utilized to generate itemsets 410 consists of three phases:

1. Generate itemset candidates.
2. Count the itemset candidates by making one pass through data.
3. Prune the itemsets with a count (support) less than the minimum support parameter.

These three steps are performed repeatedly, in each iteration generating itemsets that are 1 item longer than in the previous iteration until a) no more itemsets with a support higher than or equal to the minimum support exist in the data or b) processing stops because algorithm parameters criteria is no longer fulfilled. If the algorithm of this instance of the subject invention runs out of memory, it will most likely happen during the candidate generation phase (1). Therefore, one instance of the subject invention employs a procedure for reducing the memory utilization is as follows:

---
PRUNING ALGORITHM
---
While generating itemsets:
    If OutOfMemory exception;
        1) Raise the minimum support level;
        2) Prune all the counter vectors and reallocate;
        3) Prune all the pointer vectors and reallocate; and
        4) Reallocate the nodes themselves.

---

Steps 2-4 would not be hard if the vector and node objects were allocated independently. However, they are not due to the memory fragmentation that would otherwise occur. One instance of the subject invention utilizes a memory block allocator that allocates blocks of memory obtained from a traditional memory allocator. Requests for memory to the block allocator are served by guaranteeing a requestor a small piece of the large block, but not making an actual allocation from the main memory.

Figure 5:
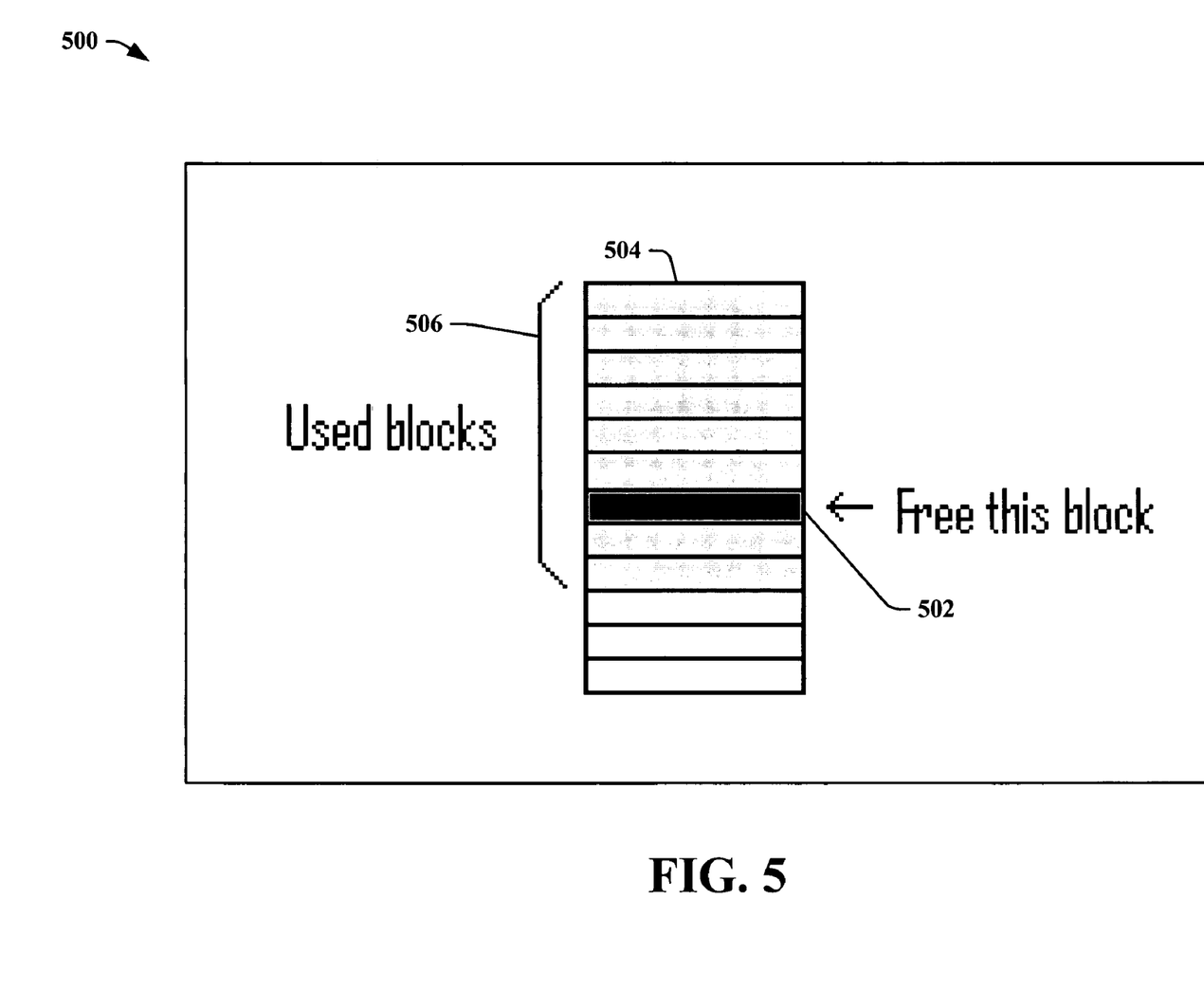
FIG. 5 is an illustration of memory block allocations in accordance with an aspect of the subject invention.

When the algorithm frees memory from the memory block allocator, it is guaranteed that complete blocks are freed from the traditional memory allocator. This is achieved, in one instance of the subject invention, by performing the same reallocation after each successful round of algorithm execution, but without increasing the minimum support level. Blocks that have no outstanding allocations are reused. In FIG. 5, an illustration 500 of memory block allocations in accordance with an aspect of the subject invention is shown. The illustration 500 depicts how one block 502 of memory 504 is being freed from a group of used blocks 506 and then reused once there are no more outstanding allocations in that block 502.

Figure 6:
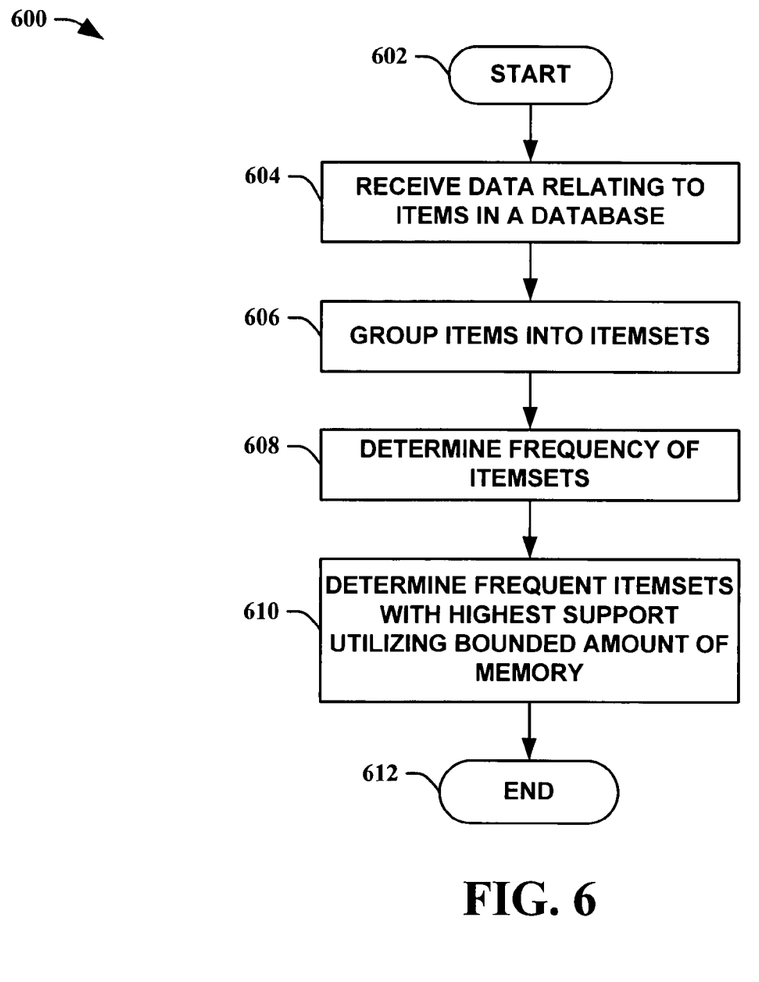
FIG. 6 is a flow diagram of a method of facilitating data analysis in accordance with an aspect of the subject invention.
Figure 7:
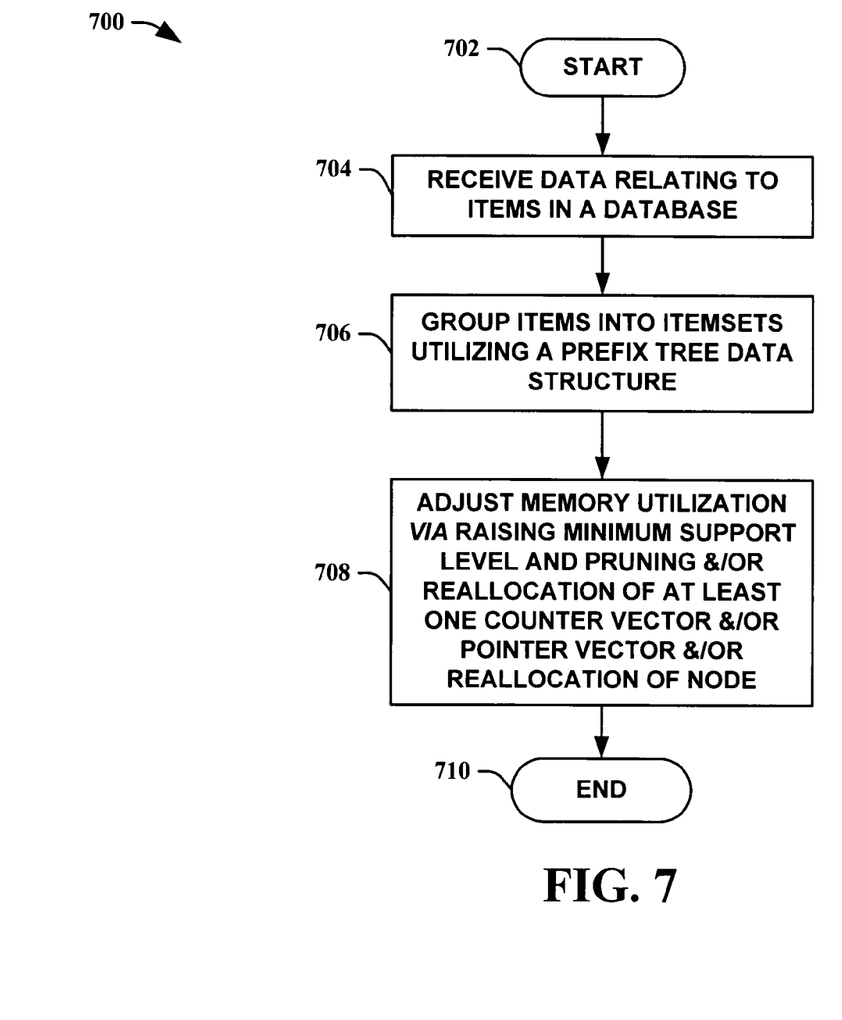
FIG. 7 is another flow diagram of a method of facilitating data analysis in accordance with an aspect of the subject invention.
Figure 8:
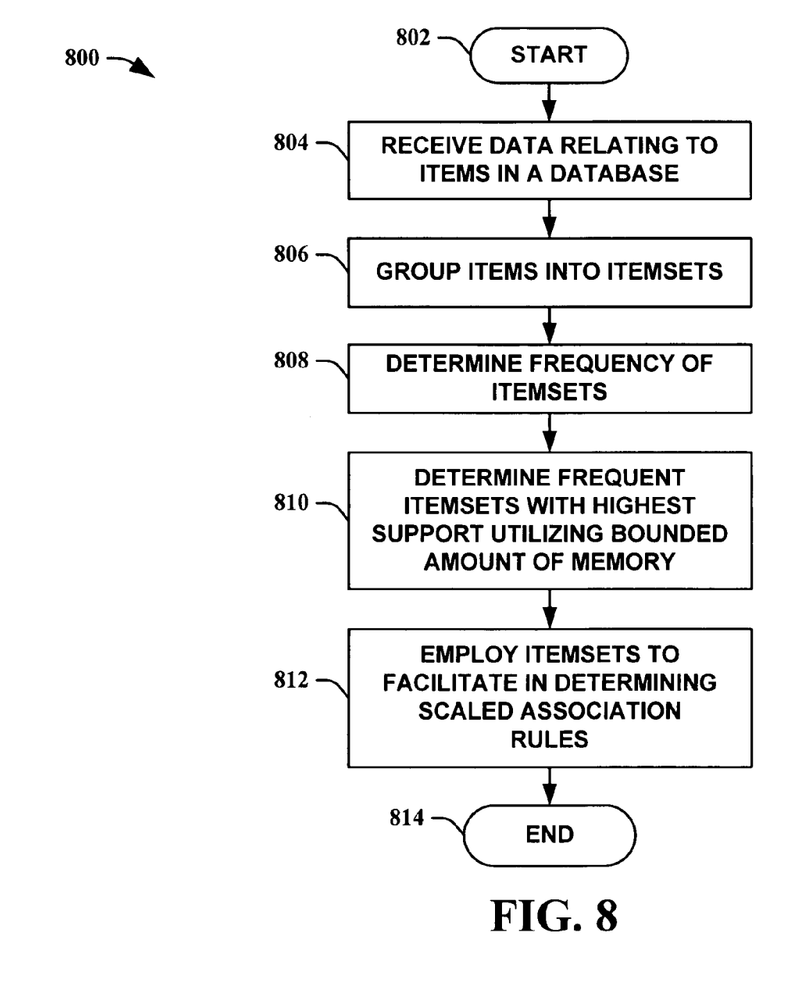
FIG. 8 is yet another flow diagram of a method of facilitating data analysis in accordance with an aspect of the subject invention.

In view of the exemplary systems shown and described above, methodologies that may be implemented in accordance with the subject invention will be better appreciated with reference to the flow charts of FIGS. 6-8. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the subject invention.

In FIG. 6, a flow diagram of a method 600 of facilitating data analysis in accordance with an aspect of the subject invention is shown. The method 600 starts 602 by receiving data that relates to items in a database 604. This data can include, but is not limited to, item information, item associations (e.g., was the item selected by a particular user and the like), time, date, and any other relevant information that can be utilized to facilitate in determining groups of items. The items are then grouped into itemsets based upon the relevant information 606. This typically includes association ties such as, for example, what combination of products customer "A" purchased, customer "B" purchased and so forth. Once the items are grouped into itemsets, the frequency of which each itemset occurs is determined 608. Basically, each time an itemset occurs, a counter is incremented to track its frequency. Frequent itemsets with the highest support utilizing a bounded amount of memory are then determined 610, ending the flow 612. As noted supra, frequent itemsets are itemsets that meet a threshold such as, for example, minimum support. Thus, one instance of the subject invention determines the highest minimum support that can be handled by the bounded amount of memory. In general, decreasing the minimum support increases memory utilization, while increasing minimum support decreases memory utilization. In other instances of the subject invention, the minimum support is dynamically adjusted to compensate for available memory. In this manner, a user receives informative data while maintaining a fast database mining process.

Referring to FIG. 7, another flow diagram of a method 700 of facilitating data analysis in accordance with an aspect of the subject invention is depicted. The method 700 starts 702 by receiving data that relates to items in a database 704. This data can include, but is not limited to, item information, item associations (e.g., was the item selected by a particular user and the like), time, date, and any other relevant information that can be utilized to facilitate in determining groups of items. The items are then grouped into itemsets utilizing the relevant information and a prefix tree data structure 706. The prefix tree efficiently stores itemsets as nodes along with their respective counts (frequencies) by recognizing that some itemsets are subsets of other itemsets. Memory utilization is then adjusted by raising a minimum support level and pruning and/or reallocating at least one counter vector and/or at least one pointer vector and/or reallocating at least one node of the prefix tree 708, ending the flow 710. In another instance of the subject invention, a pruning method is employed while the itemsets are being generated to dynamically adjust memory utilization during itemset construction. The pruning method monitors memory availability and responds accordingly via raising a minimum support level, pruning all counter vectors and reallocating their memory space, pruning all pointer vectors and reallocating their memory space, and then reallocating nodes of the prefix tree themselves. One skilled in the art can appreciate that itemsets scaled in this manner can also be utilized in the construction of scaled association rules. Thus, another instance of the subject invention utilizes the prefix tree data structure in determining scaled association rules to efficiently utilize available memory.

Turning to FIG. 8, yet another flow diagram of a method 800 of facilitating data analysis in accordance with an aspect of the subject invention is illustrated. The method 800 starts 802 by receiving data that relates to items in a database 804. This data can include, but is not limited to, item information, item associations (e.g., was the item selected by a particular user and the like), time, date, and any other relevant information that can be utilized to facilitate in determining groups of items. The items are then grouped into itemsets based upon the relevant information 806. This typically includes association ties such as, for example, what combination of products customer "A" purchased, customer "B" purchased and so forth. Once the items are grouped into itemsets, the frequency of which each itemset occurs is determined 808. Basically, each time an itemset occurs, a counter is incremented to track its frequency. Frequent itemsets with the highest support utilizing a bounded amount of memory are then determined 810. The itemsets are then employed to facilitate in determining scaled association rules 812, ending the flow 814. The scaled association rules are utilized to control memory utilization. Thus, the association rules can be scaled back to facilitate in reducing memory usage. In other instances of the subject invention, the scaled association rules are determined utilizing non-scaled itemsets. Therefore, items from a data source such as, for example, a database are utilized directly to determine association rules which are then scaled to efficiently utilize available memory.

As described supra, the subject invention can be employed to automatically adjust memory utilization for mining data via scaleable itemsets and/or scaleable association rules. This allows for informative information to be relayed to a user while providing an expedient method that utilizes memory efficiently. Thus, the subject invention substantially improves user satisfaction and quality of data mining results.

Figure 9:
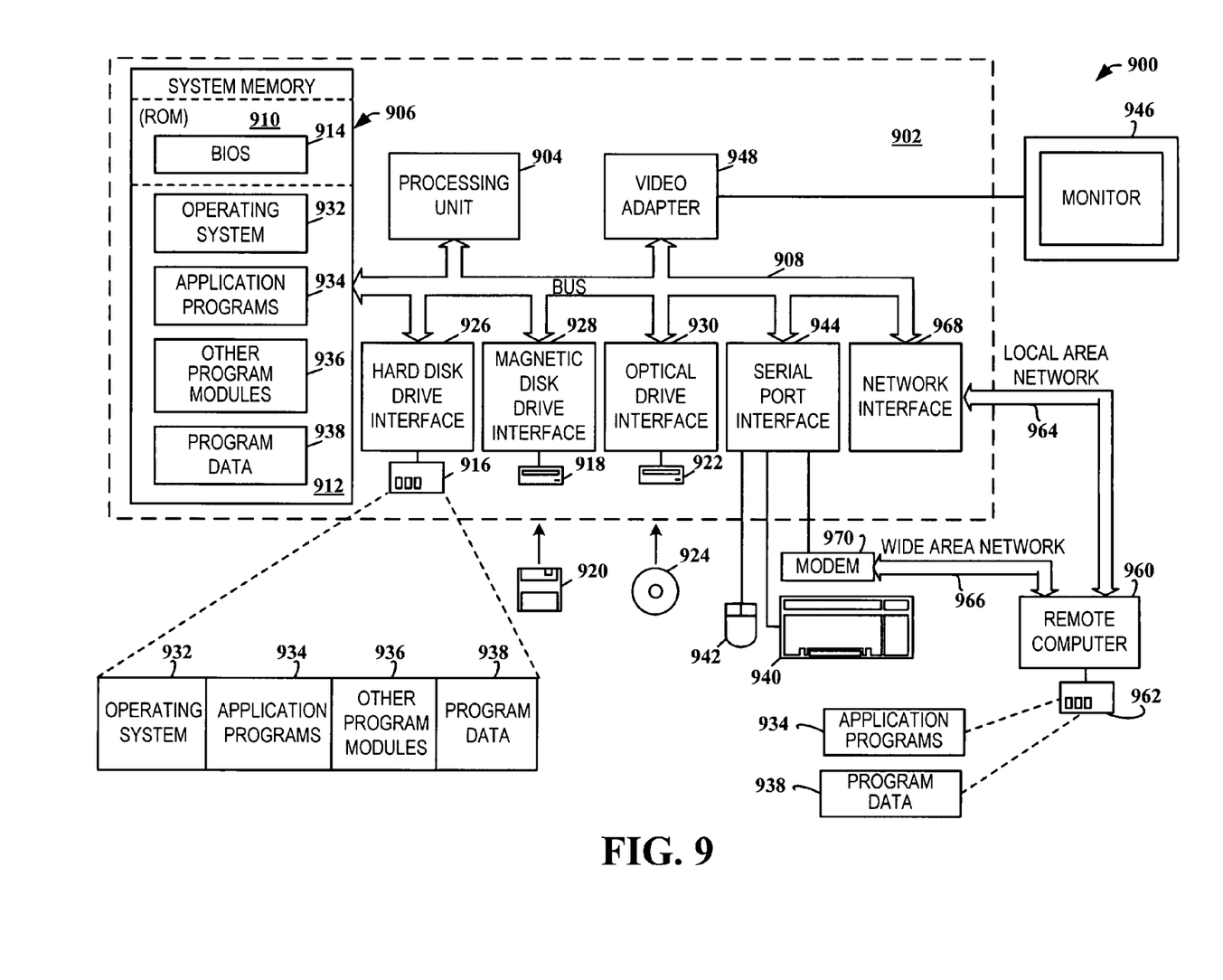
FIG. 9 illustrates an example operating environment in which the subject invention can function.

In order to provide additional context for implementing various aspects of the subject invention, FIG. 9 and the following discussion is intended to provide a brief, general description of a suitable computing environment 900 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the subject invention.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include a data analysis facilitating scheme in accordance with an aspect of the subject invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, a wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment using logical connections to one or more remote computers 960. The remote computer 960 may be a workstation, a server computer, a router, a peer device or other common network node, and typically includes many or all of the elements described relative to the computer 902, although for purposes of brevity, only a memory storage device 962 is illustrated in FIG. 9. The logical connections depicted in FIG. 9 can include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be used when carrying out an aspect of the subject invention.

In accordance with the practices of persons skilled in the art of computer programming, the subject invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
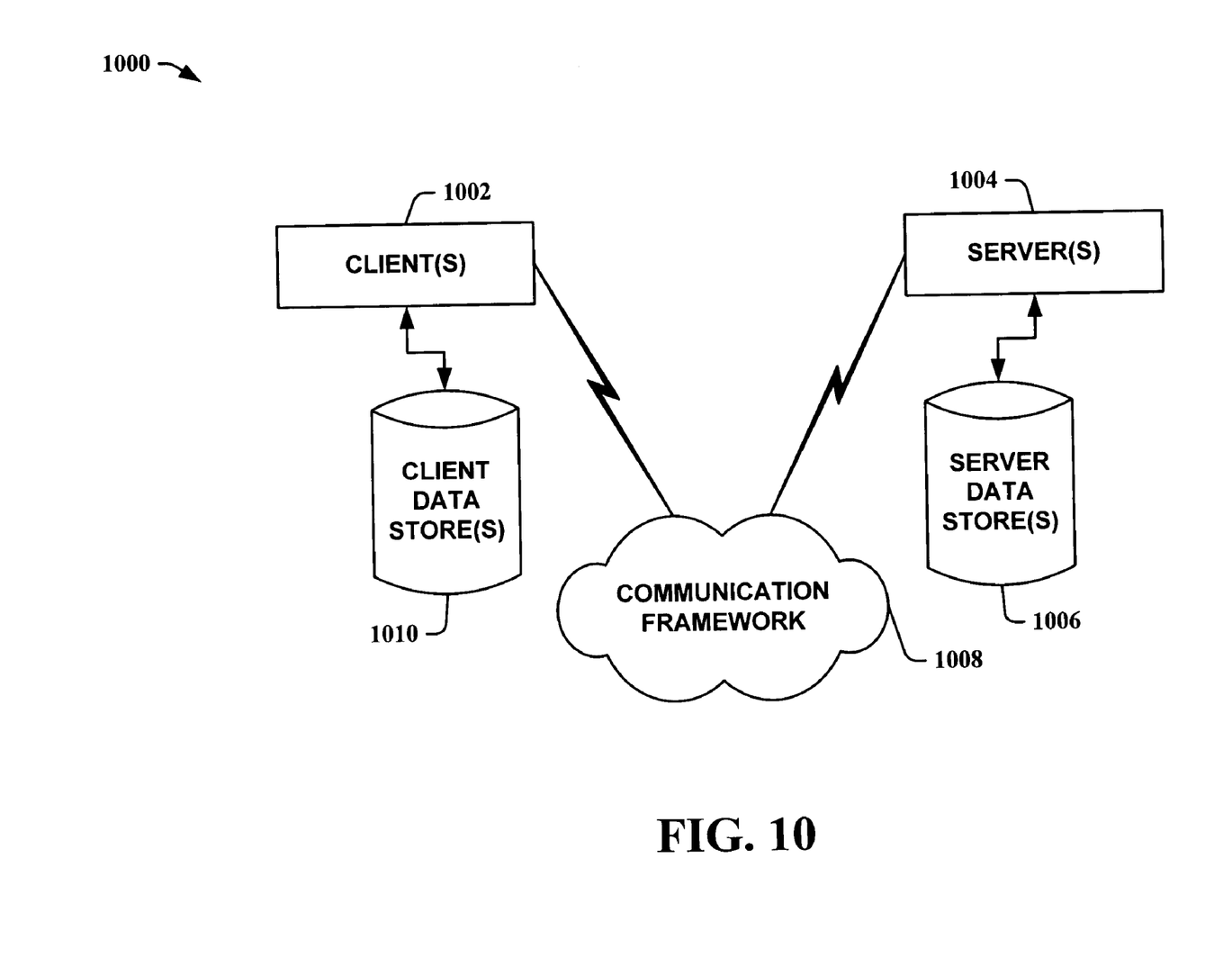
FIG. 10 illustrates another example operating environment in which the subject invention can function.

FIG. 10 is another block diagram of a sample computing environment 1000 with which the subject invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are connected to one or more client data store(s) 1010 that can be employed to store information local to the client(s) 1002. Similarly, the server(s) 1004 are connected to one or more server data store(s) 1006 that can be employed to store information local to the server(s) 1004.

In one instance of the subject invention, a data packet transmitted between two or more computer components that facilitates data analysis is comprised of, at least in part, information relating to an itemset determination system that utilizes, at least in part, a process that determines frequent itemsets with the highest support utilizing a bounded amount of memory.

It is to be appreciated that the systems and/or methods of the subject invention can be utilized in data analysis facilitating computer components and non-computer related components alike. Further, those skilled in the art will recognize that the systems and/or methods of the subject invention are employable in a vast array of electronic related technologies, including, but not limited to, computers, servers and/or handheld electronic devices, and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data analysis, comprising:
a data receiving component that receives data relating to items in a database; and
an itemset determination component that groups the items into scalable itemsets based in part on available computer resources that are dynamically determined and determines frequent itemsets with the highest support utilizing a bounded amount of memory and dynamically adjusts minimum support to limit memory utilization, the frequent itemsets dynamically determined based at least in part on one or more computer resource parameters,
wherein a memory operatively coupled to a processor retains at least one of the data receiving component or the itemset determination component.

2. The system of claim 1, the itemset determination component utilizes a prefix tree data structure to facilitate in constructing itemsets; the itemsets based on a minimum support level.

3. The system of claim 2 further comprising:
a memory utilization component that scales the minimum support level for determining itemsets to adjust memory utilization required to store information relating to the itemsets.

4. The system of claim 3, the memory utilization component dynamically scales the minimum support level in response to available memory.

5. The system of claim 3, the memory utilization component adjusts memory utilization via pruning and/or reallocation of at least one counter vector and/or pointer vector and/or reallocation of at least one node of the prefix tree data structure.

6. The system of claim 5 further comprising:
a memory allocation component that ensures that vectors and/or nodes of the prefix data tree structure are allocated memory independently to allow complete memory block reallocations.

7. The system of claim 1 further comprising:
an association rule determination component that determines association rules based on, at least in part, the frequent itemsets.

8. A method for facilitating data analysis, comprising:
receiving data relating to items in a database;
receiving memory parameters to dynamically determine available memory, the memory parameters including at least one of memory type, memory speed, or memory location;
grouping the items into scalable itemsets and determining their frequencies, the scalable itemsets based in part on a dynamically adjustable minimum support value determined based on the at least one memory parameter; and
determining frequent itemsets with the highest support based at least in part on the at least one memory parameter.

9. The method of claim 8 further comprising:
dynamically adjusting minimum support to limit memory utilization.

10. The method of claim 8 further comprising:
utilizing a prefix tree data structure to facilitate in constructing itemsets; the itemsets based on a minimum support level.

11. The method of claim 10 further comprising:
scaling the minimum support level for determining itemsets to adjust memory utilization required to store information relating to the itemsets.

12. The method of claim 11 further comprising:
dynamically scaling the minimum support level in response to available memory.

13. The method of claim 11 further comprising:
adjusting memory utilization via pruning and/or reallocation of at least one counter vector and/or pointer vector and/or reallocation of at least one node of the prefix tree data structure.

14. The method of claim 13 further comprising:
allocating memory for vectors and/or nodes of the prefix data tree structure independently to allow complete memory block reallocations.

15. The method of claim 8 further comprising:
determining association rules based on, at least in part, the frequent itemsets.

16. The method of claim 9 further comprising:
determining association rules based on, at least in part, the frequent itemsets.

17. The method of claim 10 further comprising:
determining association rules based on, at least in part, the frequent itemsets.

18. A system that facilitates data analysis, comprising:
means for receiving data relating to items in a database;
means for receiving at least one memory parameter to dynamically determine available memory;
means for grouping the items into scalable itemsets, the scalable itemsets based in part on a dynamically adjustable minimum support value that is determined based on the at least one memory parameter; and
means for determining at least one of frequent itemsets with the highest support or association rules based at least in part on the at least one memory parameter,
wherein a memory operatively coupled to a processor retains at least one of the means.

* * * * *